(12) United States Patent
Allensworth et al.

(10) Patent No.: US 9,932,178 B2
(45) Date of Patent: Apr. 3, 2018

(54) ADJUSTMENT DEVICE FOR GRAIN HANDLING CONVEYOR

(71) Applicant: Yetter Manufacturing Company, Colchester, IL (US)

(72) Inventors: Derek W. Allensworth, Blandinsville, IL (US); Gary Lantz, Colchester, IL (US); James D. Lascelles, Ipava, IL (US)

(73) Assignee: Yetter Manufacturing Company, Colchester, IL (US)

( * ) Notice: Subject to any disclaimer, the term of this patent is extended or adjusted under 35 U.S.C. 154(b) by 0 days.

(21) Appl. No.: 14/996,805

(22) Filed: Jan. 15, 2016

(65) Prior Publication Data

US 2016/0207715 A1    Jul. 21, 2016

Related U.S. Application Data

(60) Provisional application No. 62/103,696, filed on Jan. 15, 2015.

(51) Int. Cl.
*B65G 41/00* (2006.01)
*B60S 9/04* (2006.01)
*B62D 39/00* (2006.01)
*A01C 15/00* (2006.01)

(52) U.S. Cl.
CPC .............. *B65G 41/002* (2013.01); *B60S 9/04* (2013.01); *B62D 39/00* (2013.01); *B65G 41/008* (2013.01); *A01C 15/003* (2013.01)

(58) Field of Classification Search
CPC .................................................... B65G 41/002
USPC ...... 198/302, 312, 315, 316.1, 861.5, 861.3, 198/861.1
See application file for complete search history.

(56) References Cited

U.S. PATENT DOCUMENTS 8,584,826 B2 * 11/2013 Smith .................. B65G 41/002
198/302

FOREIGN PATENT DOCUMENTS

FR         2511983 A1 *  3/1983  ............. B65G 21/12

* cited by examiner

*Primary Examiner* — Gene O Crawford
*Assistant Examiner* — Lester Ill Rushin
(74) *Attorney, Agent, or Firm* — Mark J. Nahnsen; Barnes & Thornburg LLP (57) ABSTRACT

A grain handling conveyor includes an axle tilt device that is coupled to a frame supporting a grain handling conveyor and to an axle thereof. The axle tilt device is capable of raising or lowering one end of the axle with respect to the frame and to permit the tilting the frame and causing movement of the discharge end of the conveyor for accurate conveying of bulk material into a silo.

19 Claims, 15 Drawing Sheets

ADJUSTMENT DEVICE FOR GRAIN HANDLING CONVEYOR

PRIORITY CLAIM

This application claims priority from to U.S. Provisional Application Ser. No. 62/103,696, filed Jan. 15, 2015, which is expressly incorporated by reference herein.

FIELD OF THE DISCLOSURE

The present disclosure relates generally to conveyors, and more specifically to grain handling conveyors.

BACKGROUND

The present disclosure relates to grain handling conveyors, and particularly to control devices used to control the location of the discharge end of the conveyor to permit alignment of the discharge end with the top opening in the grain storage bin. Aligning the discharge end of the conveyor with the opening in the top of a grain storage bin is a challenging and time consuming process, especially if the grain handling conveyor and storage bin are high and the target inlet is small. The is a need to provide an adjustment mechanism that would allow an operator to easily align the discharge end of the grain handling conveyor relative to a top opening of the grain silo.

SUMMARY

In illustrative embodiments, a grain handling conveyor includes an axle tilt device that is coupled to a frame supporting a grain handling conveyor and to an axle thereof. The axle tilt device is capable of raising or lowering one end of the axle with respect to the frame and to permit the tilting the frame and causing movement of the discharge end of the conveyor.

In illustrative embodiments, the axle tilt device includes a spindle plate mounted to a hub assembly of one end of the axle, a hydraulic cylinder or other extension device coupled to the spindle plate at a first end, and to a frame bracket at a second end. Movement of the hydraulic cylinder causes the spindle plate to rotate which, in turn, causes a first end of the axle to raise or lower, moving the discharge end of the grain handling conveyor.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 3A, 3B, and 3C show the axle tilt device 100 tilting the axle of the conveyor, moving the upper portion of the conveyor from the left, as shown in FIG. 3A to the right, as shown in FIG. 3C;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
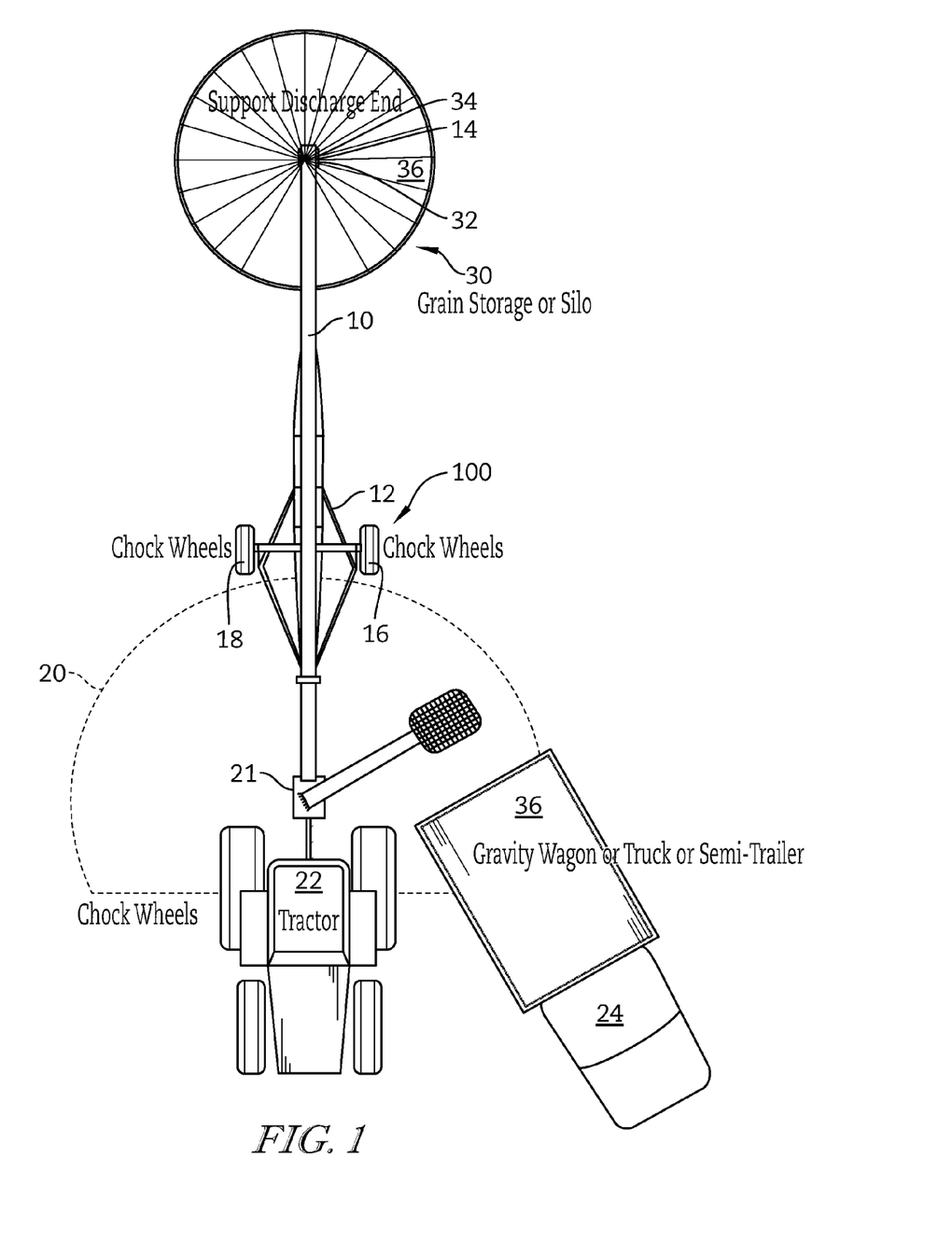
FIG. 1 is a top plan view illustrating a tractor coupled to a grain handling conveyor, a, having a discharge end 14 positioned over a top opening of a grain storage bin 30, discharge end 14 storage bin 30.

As shown in FIG. 1, a grain handling conveyor 10 includes a frame 12 extends from an intake area 20 to a discharge end 14 positioned above a top opening 32 of a grain storage bin or storage bin 30. Frame 12 of the conveyor 10 is supported by an axle 40 that includes first and second wheels 16, 18. Wheels 16, 18 permit grain handling conveyor 10 to be transported between multiple grain storage bins. Frame 12 of conveyor 10 is coupled to a tractor 22 or other motive force. In use, tractor 22 moves conveyor 10 into position so that discharge end 14 of conveyor 10 is positioned above the top opening 32 of the storage bin 30. Properly aligning discharge end 14 of conveyor 10 historically has been a labor intensive and time consuming process. discharge end 14 storage bin 30 discharge end 14 storage bin 30 discharge end 14 storage bin 30

As suggested by FIG. 1, the conveyor 10, supported by frame 12 delivers grain 36 or other harvested crops from ground level at an intake area 20 to discharge end 14 positioned above a top opening 32 of a storage bin 30. The conveyor 10 may be moved into position by the tractor 22 or other farm equipment. A delivery truck or semi-trailer 24 or other farm equipment delivers the grain 36 or other crop to the intake area 20, where the grain 36 is moved to an intake area 21 for the conveyor 10. Conveyor 10 elevates the grain 36 to the discharge end 14 positioned above the top opening 32 of the storage bin 30. The grain 36 falls from the discharge end 14 into the storage bin 30 through the top opening 32.

Conveyor 10 may consist of a hollow tube with an auger inside to elevate the grain 36. Other forms of conveyors capable of lifting grain 36 or other crop from the ingest area 21 to the discharge end 14 may be used, such as a belt conveyor, for example. A spreader 34 may be used to ensure the grain falls evenly into the storage bin 30 and evenly fills the storage bin 30.

Figure 3A:
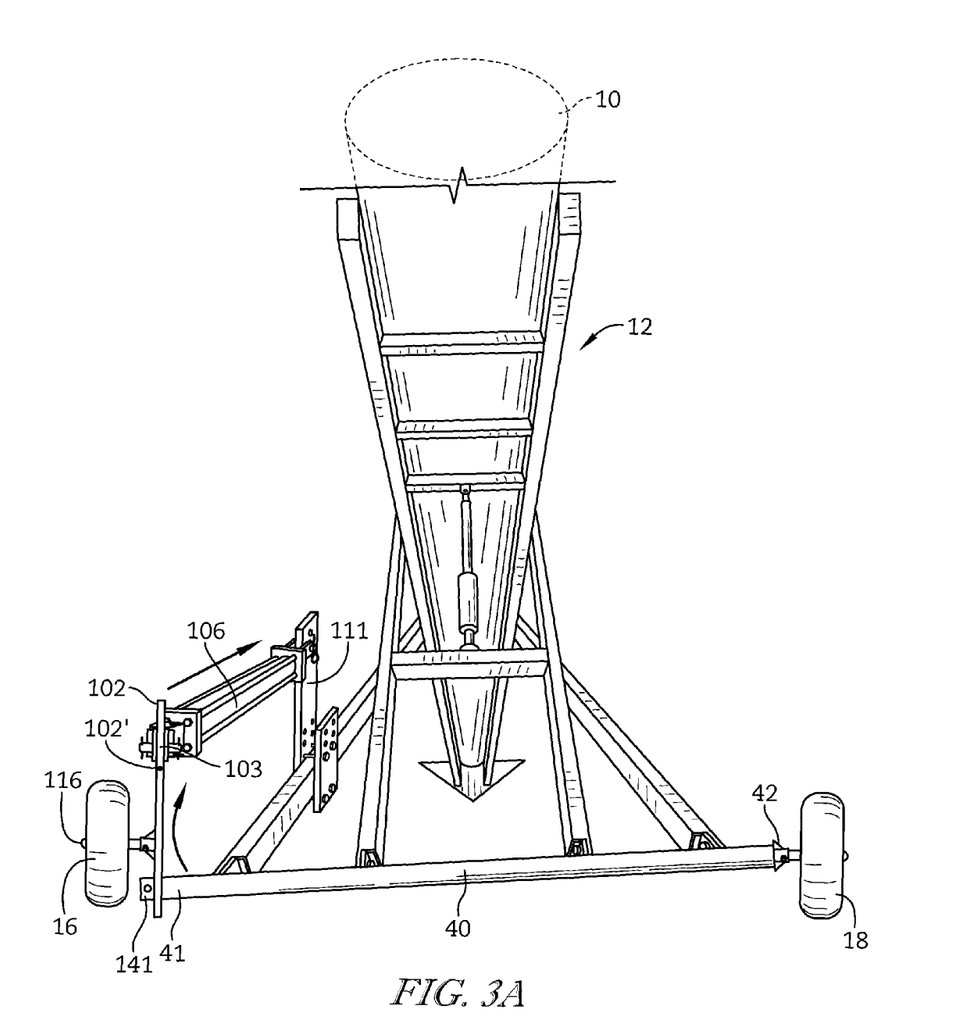
FIG. 3A is a storage bin 30 perspective view of the conveyor of FIG. 2, showing the axle in its lowest position with the hydraulic cylinder in the retracted position.
Figure 3B:
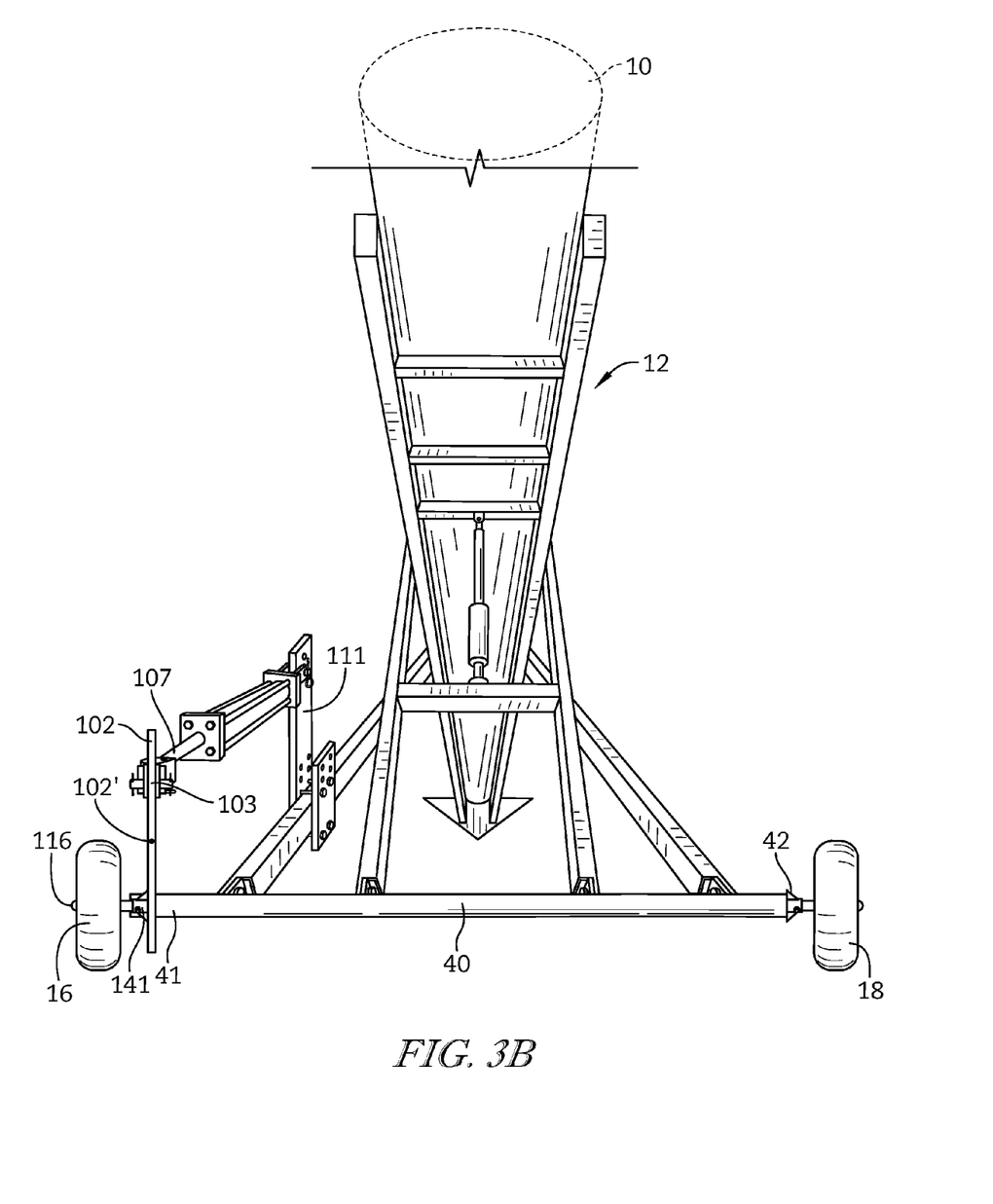
FIG. 3B is a perspective view similar to FIG. 3A showing the hydraulic cylinder partially extended and the end of the axle closest to the axle tilter moving upward and the upper portion of the tube conveyor moving to the right as indicated by the arrows.
Figure 3C:
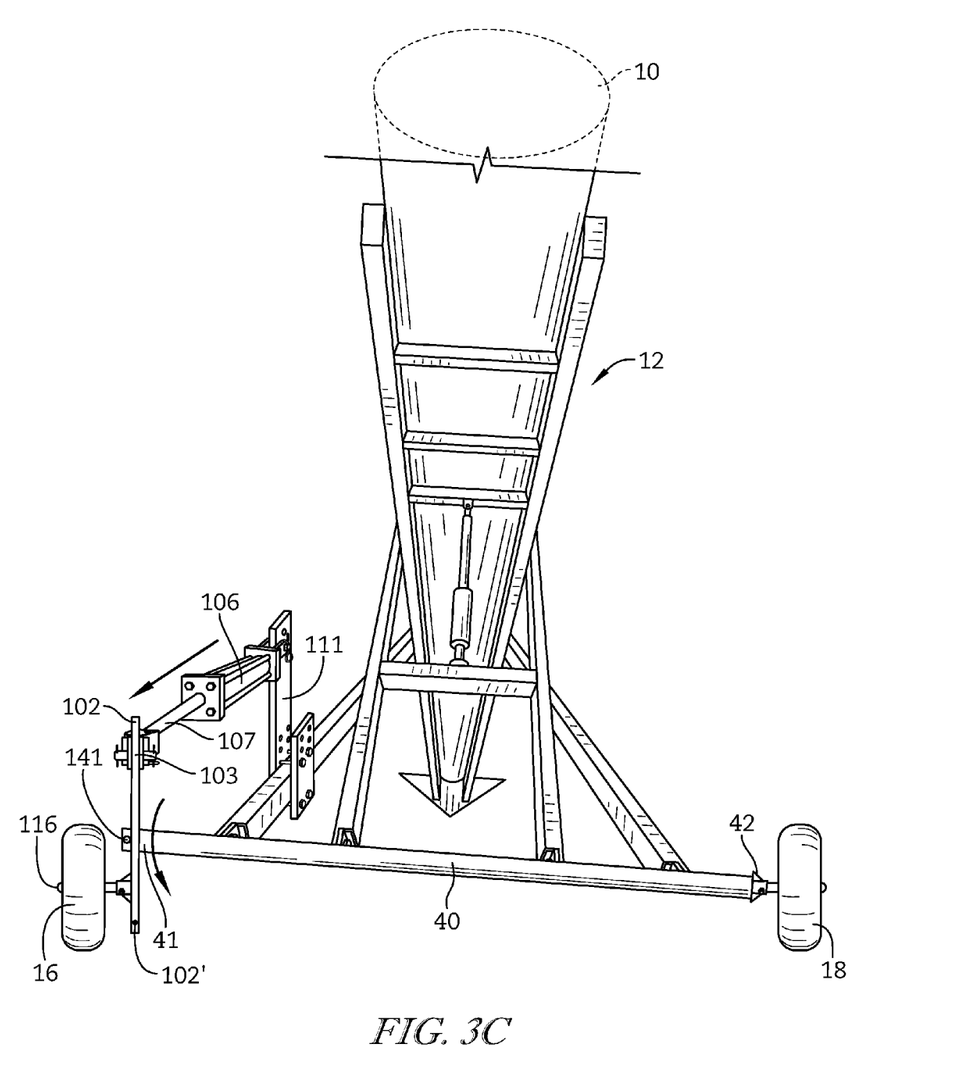
FIG. 3C is a perspective view similar to FIGS. 3A and 3B showing the hydraulic cylinder fully extended and the end of the axle closest to the axle tilter in the upper most position and the upper portion of the tube conveyor moved all the way to the right as indicated by the arrows.
Figure 4:
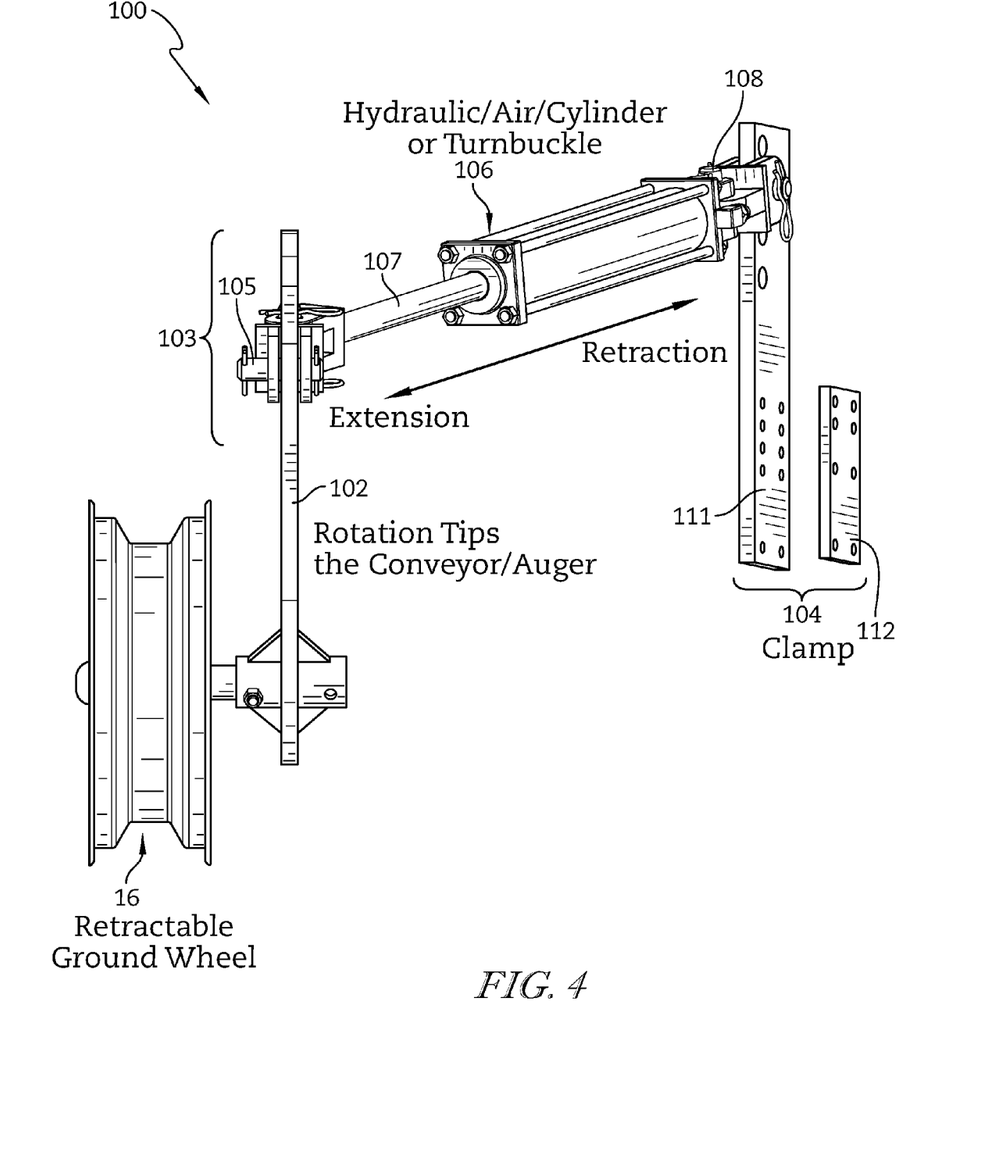
FIG. 4 is a perspective view of the axle tilt device 100 showing a spindle plate mounting plate 111 having a wheel and a hydraulic ram coupled to the spindle plate, and a mounting bracket coupled to a second end of the hydraulic ram.
Figure 5:
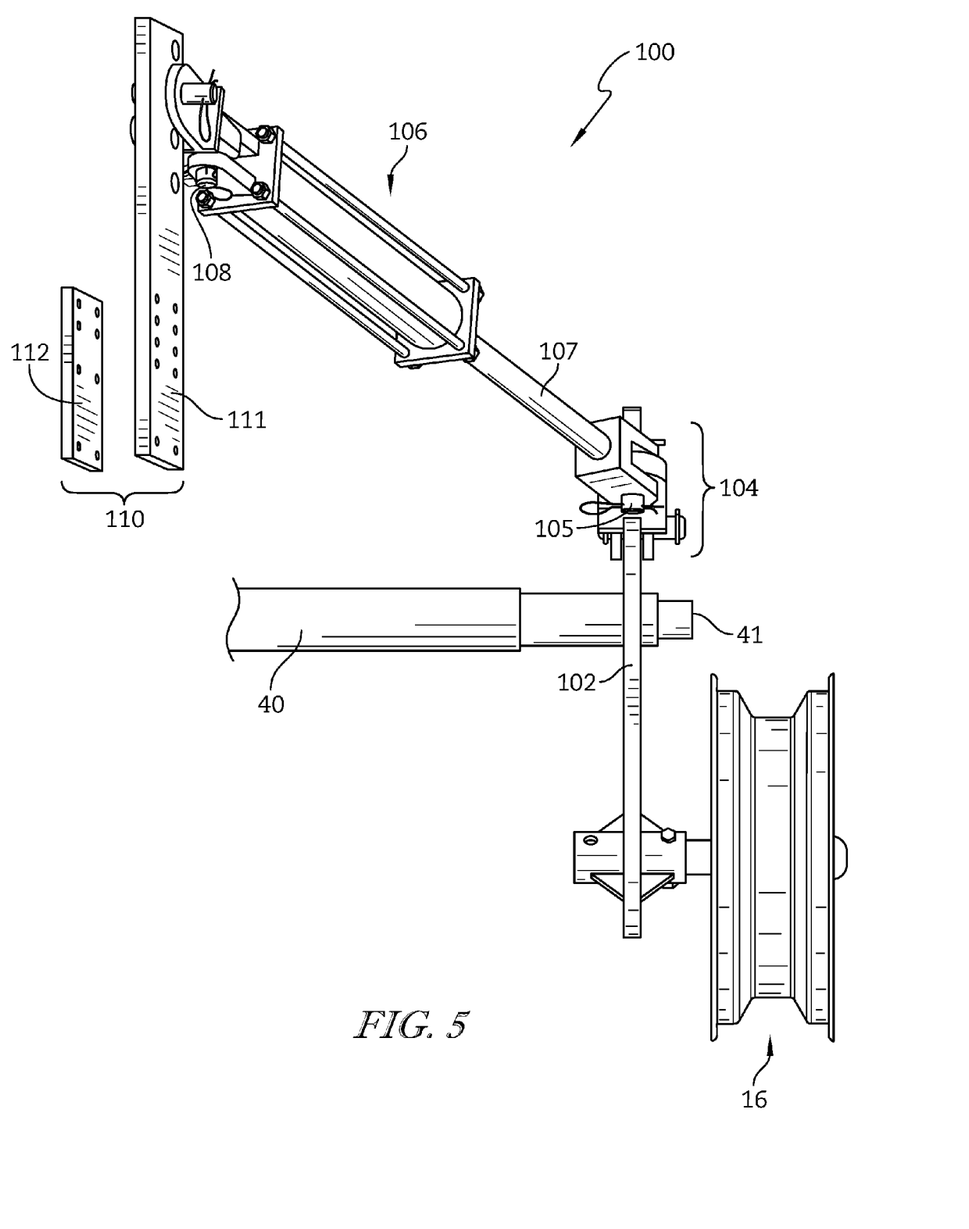
FIG. 5 is a perspective view of the axle tilt device coupled to an axle.

As shown in FIG. 3, an axle tilt device 100 is mounted to frame 12 supporting conveyor 10. Axle tilt device 100 is coupled to hub assembly 141 of axle 40. hub hub mount 141 Second end 42 of the axle 40 is coupled to a second wheel 18. Axle 40 is also coupled to frame 12. Axle tilt device 100 raises or lowers the first end 41 of the axle 40 at the first end 41 and thereby tilts frame 12 and moves a discharge end 14 of conveyor 10 relative to the top opening 32 of storage bin 30.

As shown in FIGS. 3A, 3B, and 3C, the rotation position of spindle plate 102 of axle tilt device 100 with respect to axle 40 controls the position of the first end 41 of the axle 40. The position of axle 40 changes the angle of the frame 12 supporting the conveyor 10 relative to the ground. As shown in FIG. 3B, axle 40 is level and parallel to the ground. In this configuration, the conveyor 10 is not tilted. As shown in FIG. 3A, axle tilt device 100 lowers axle 40 at the first end 41. This is caused by extending hydraulic cylinder 106, which causes rotation of spindle plate 102. The conveyor 10 and supporting frame 12 are tilted in the direction of the first end 41. As shown in FIG. 3C, the axle tilt device 100 raises the first end 41 of axle 40 to move the discharge end 14 of conveyor 10 to the right as indicated by the arrow. Conveyor 10 and frame 12 are tilted in the direction of the second wheel 18. Raising of the first end 41 of axle 40 is caused by retraction of hydraulic cylinder 106 and rotation of spindle plate 102.

Figure 6:
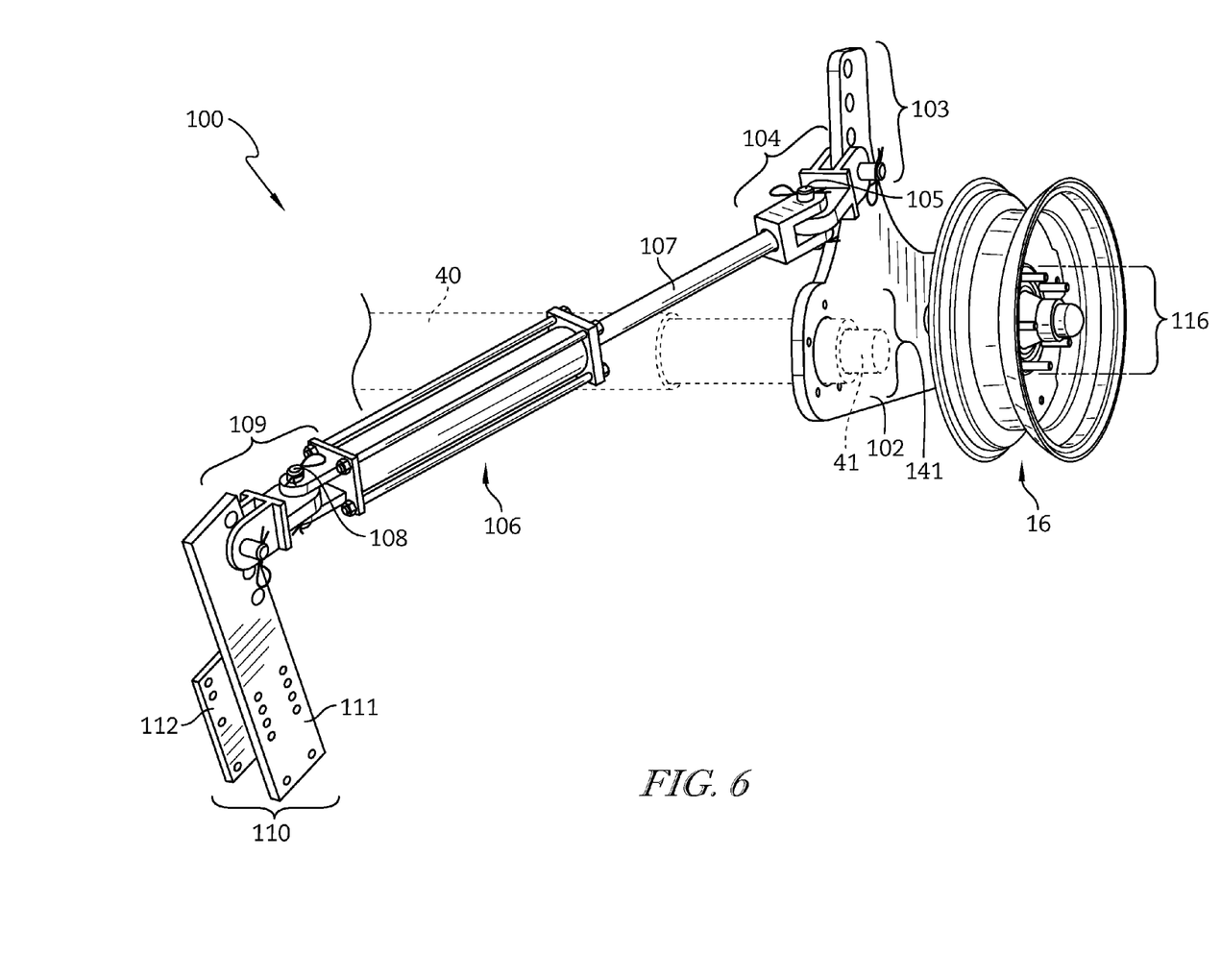
FIG. 6 is a perspective view of the axle tilt device hub mount 141 showing the spindle plate coupled to a free hub of an axle, in phantom, and showing a wheel rim coupled to the spindle plate.
Figure 7:
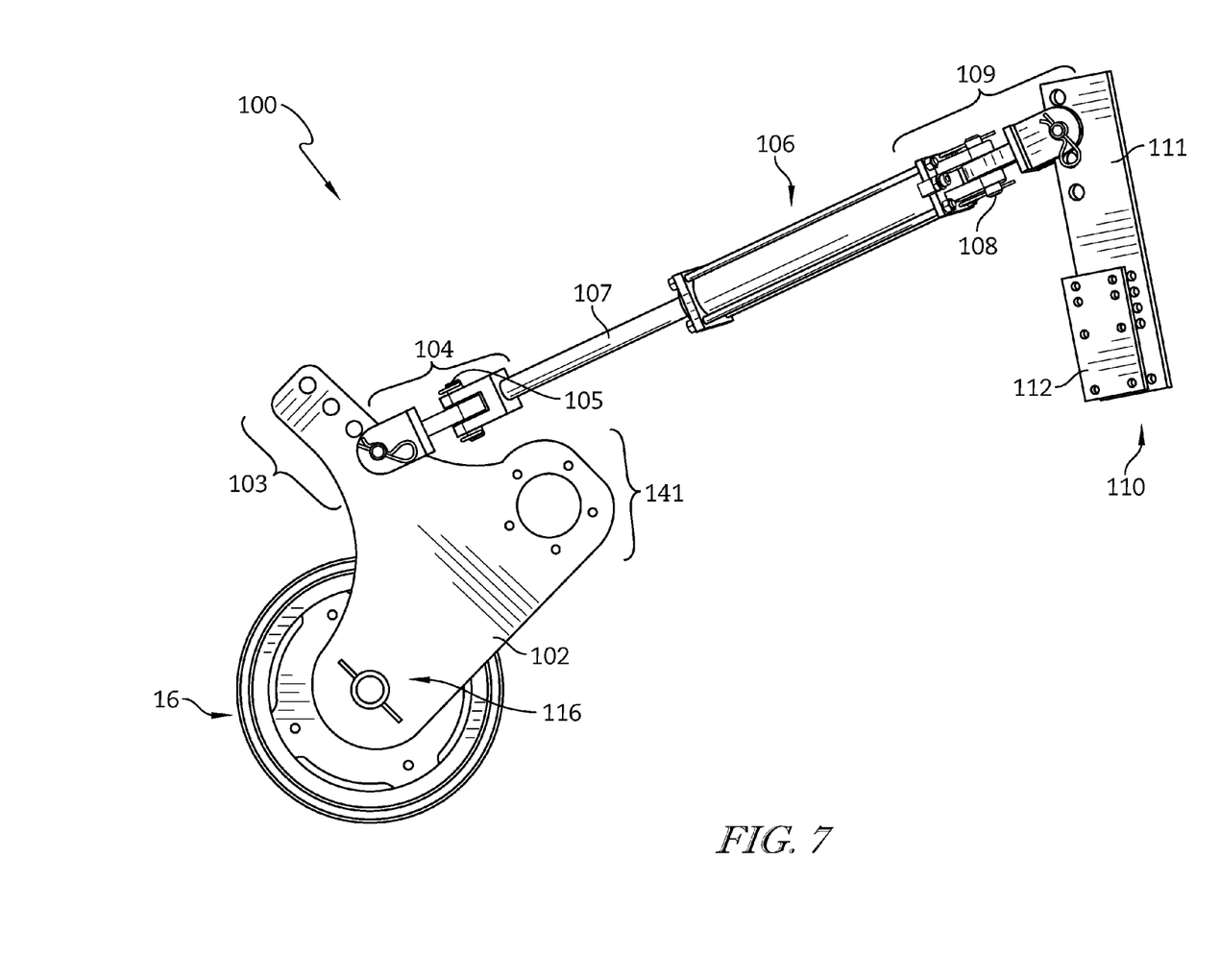
FIG. 7 is a side perspective view of the axle tilt device showing the hydraulic ram in an extended position and a wheel rim coupled to the spindle plate.

Axle tilt device 100 includes spindle plate 102 that includes a hub mount 141. Hub mount 141 permits spindle plate 102 to be coupled to the first end 41 of the axle 40 as shown in FIGS. 4-8. Spindle plate 102 also includes an outboard hub assembly 116. Outboard hub assembly 116 permits a first wheel 16 to be coupled to spindle plate 102. As shown in FIG. 6, the hub mount 141 is closer to a clamp 110 than the outboard hub assembly 116.

Spindle plate 102 also includes a multiple position bracket arm 103 that is rotatably coupled in a horizontal axis and a vertical axis by a first pivot mount 104, as shown in FIG. 6. The pivot mount 104 includes a first clevis pin 105 located in the middle of the horizontal portion of the first pivot mount 104 to secure pivot mount 104 to hydraulic cylinder 106. While hydraulic cylinder 106 is shown, it is contemplated that an air cylinder, a turnbuckle, a motor or manually driven screw could also be used or other telescopic devices known to those of skill in the art. Alternatively, a gear could be coupled to the spindle plate 102 and a gear motor (not shown) could be used to drive the gear coupled to the spindle plate to rotate the spindle plate 102 about an axis of rotation of the axle 40.

Hydraulic cylinder 106 is pivotally coupled in a horizontal axis and a vertical axis by a second pivot mount 109 to a mounting plate 111. The second pivot mount 109 includes a second clevis pin 108 located in the middle of the horizontal portion of the second pivot mount 109. Support plate 112 cooperates with the mounting plate 111 to act as a clamp 110 to couple axle tilt device 100 to a mounting cross member 114 of frame 12 of the conveyor 10, as shown in FIG. 8.

Hydraulic cylinder 106 controls rotation of spindle plate 102 by extending or retracting. When Retraction of rod 107 of hydraulic cylinder 106, pulls causes bracket arm 103 of spindle plate 102 toward frame 12 of conveyor 10. This movement causes spindle plate 102 to rotate about hub 17 of axle 40. Rotation of spindle plate 102 lowers the wheel 16. Lowering wheel 16 lowers first end 41 of axle 40, tilting frame 12 and the conveyor 10 in the direction of the first wheel 16 as shown in FIG. 3A. When rod 107 of hydraulic cylinder 106 extends, it pushes bracket arm 103 away from frame 12 of the conveyor 10, causing the spindle plate 102 to rotate about hub 17 of axle 40. The rotating spindle plate 102 lowers wheel 16 and elevates first end 41 of axle 40. Rotating of spindle plate 102 about hub 17 raises the first end 41 of axle 40, tilting axle 40, frame 12 and the conveyor 10 in the direction of the second wheel 18 as shown in FIG. 3C.

Figure 8:
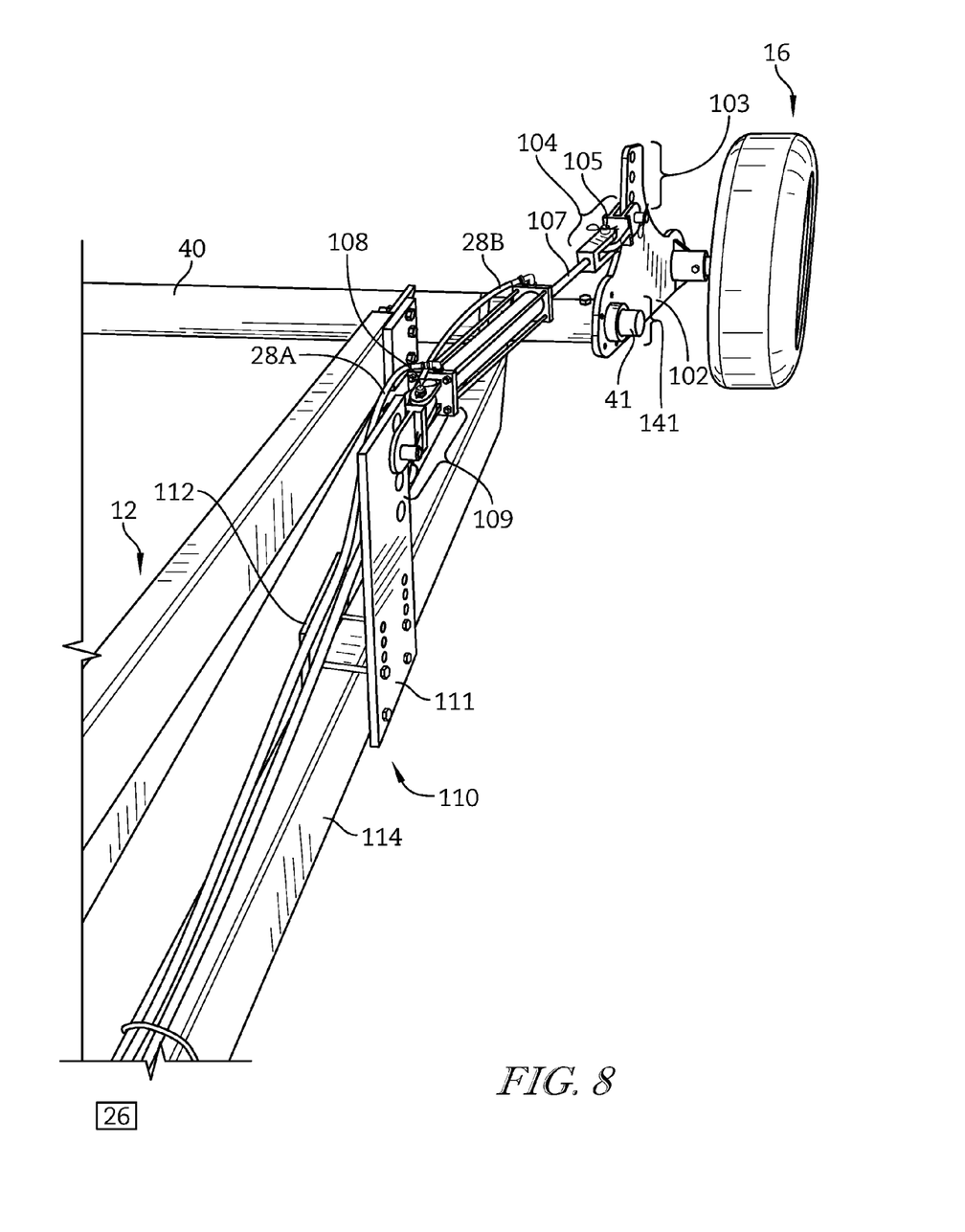
FIG. 8 is a perspective view of the axle tilt device coupled to a frame member of the grain handling conveyor and showing the spindle plate coupled to the hub of the axle.

Hydraulic cylinder 106 is extended and retracted by a hydraulic controller (not shown) that is coupled to hydraulic cylinder 106 by use of a pair of hydraulic lines 28A & 28B, as suggested in FIG. 8. Hydraulic pressure can be supplied by the hydraulic system of a tractor 22 or other hydraulic source.

Figure 2:
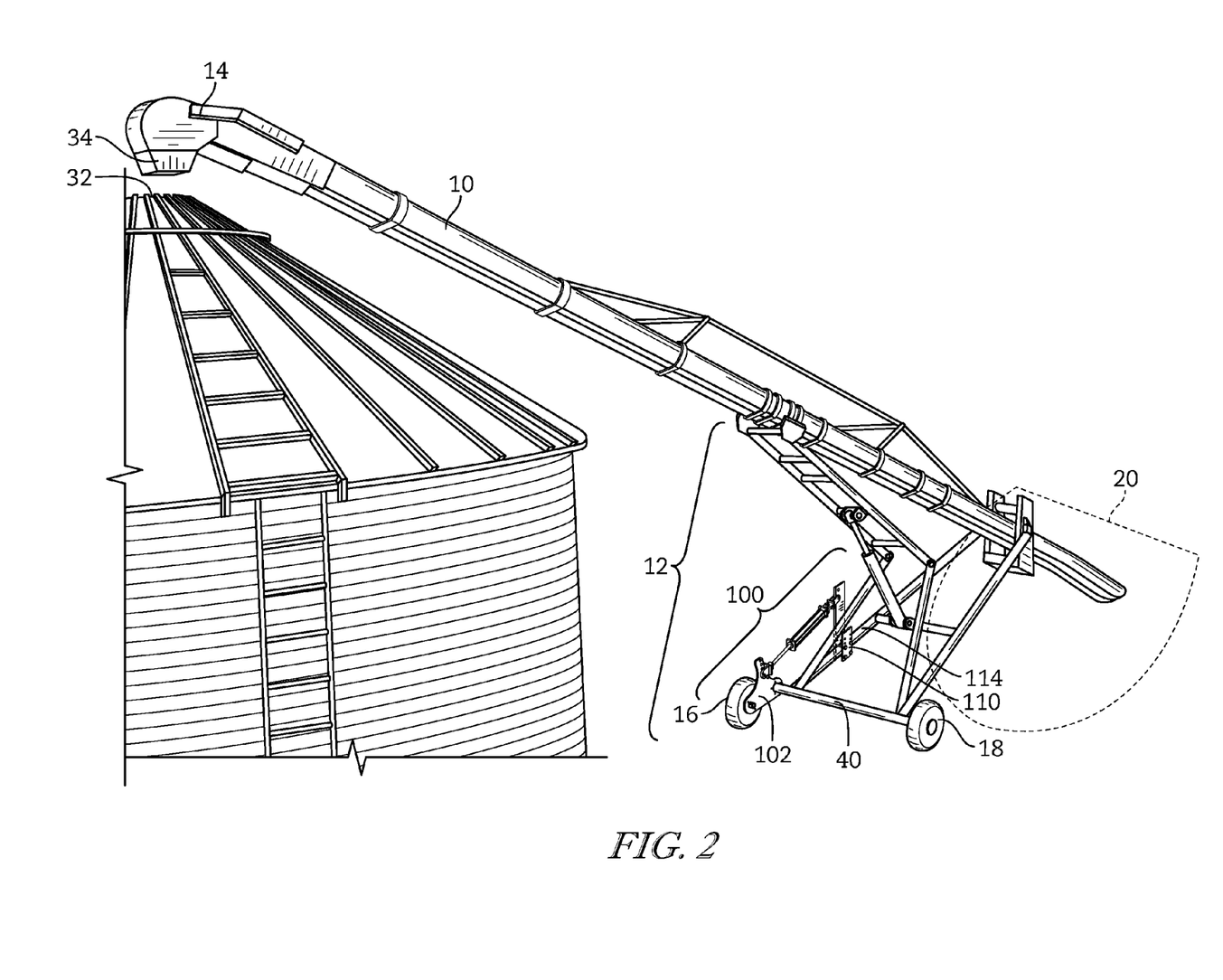
FIG. 2 is a perspective view of the grain handling conveyor with the discharge end positioned over the opening of the grain storage bin 30 and also showing the axle tilt device coupled to the frame of the conveyor.

Axle tilt device 100 is mounted to frame 12 supporting conveyor 10 as shown in FIGS. 2 & 8. As shown in FIG. 8, mounting plate 111 and the support plate 112 are coupled together by use of fasteners 113 to couple the axle tilt device 100 to the mounting cross member 114 of the frame 12. The spindle plate 102 is coupled to axle 40 by the hub mount 141 and to the first wheel 16 by an hub assembly 116.

Hydraulic cylinder 106 extends or retracts rod 107 that is rotatably coupled in a horizontal axis and a vertical axis by a first pivot mount 104 of spindle plate 102. Mounting plate 111 is rotatably coupled in a horizontal axis and a vertical axis to the hydraulic cylinder 106 by second pivot mount 109. Pressure is increased or decreased in the first or second control lines 28A, 28B to extend or retract rod 107 of hydraulic cylinder 106. Both control lines 28A & 28B may be positioned along mounting cross member 114 of frame 12.

When the conveyor 10 is being moved to the storage bin 30 by tractor 22 or other means, axle 40 is preferably level, as shown in FIG. 3B. The first wheel 16 is coupled to the spindle plate 102 by the hub assembly 116. The spindle plate 102 is coupled to the first end 41 of axle 40 by the hub mount 141. The second end 42 of axle 40 is coupled to the second wheel 18. Axle 40 is coupled to the frame 12 supporting the conveyor 10.

Hydraulic cylinder 106 or other extension device is partially extended. The partial extension of rod 107 of hydraulic cylinder 106 positions spindle plate 102 so that the hub assembly 116 is level with the hub mount and axle 40 is level with the ground. To clarify the rotation of the spindle plate 102, spindle plate rotation marker 102' is labeled to show the direction of rotation in FIGS. 3A, 3B, and 3C.

Conveyor, shown in FIG. 3A, is tilted to the left in the direction of the first wheel 16. The hydraulic cylinder 106 retracts rod 107 and reduces the distance between the first pivot mount 104 to bracket arm 103 of spindle plate 102 and the second two-rotation mount 109 to the mounting plate 111. The mounting plate 111 is fixedly coupled to the mounting cross member 114 of the frame 12 by bolts to the second bracket 112. The bracket arm 103 is pulled toward the mounting plate 111 rotating spindle plate 102 in the direction shown in FIG. 3A toward mounting plate 111.

Consequently, the spindle plate rotation marker 102' appears higher than the position in FIG. 3B. Hub mount 141 rotates with the spindle plate 102 and the hub mount 141 moves to a position below hub assembly 116. Rotation of spindle plate 102 lowers the hub mount 141 and lowers the first end 41 of axle 40. Axle 40 tilts in the direction of first end 41. The frame 12 and conveyor 10 tilt in the direction of first wheel 16. As shown in FIG. 3A, a discharge end 14 of the conveyor 10 is moved to the left.

As shown in FIG. 3C, conveyor 10 is tilted to the right in the direction of the first wheel 16. Hydraulic cylinder 106 extends rod 107 and increases the distance between the first pivot mount 104 to bracket arm 103 of spindle plate 102 and second pivot mount 109 to the mounting plate 111. Mounting plate 111 is fixedly coupled to mounting cross member 114 of frame 12 by bolts 113 to second bracket 112.

Bracket arm 103 is pulled toward the mounting plate 111 and the spindle plate 102 rotates in the direction shown in FIG. 3C away from the mounting plate 111. Consequently, the spindle plate rotation marker 102' appears lower than the spindle plate rotation marker 102' appears in FIG. 3B. The hub mount 141 rotates with the spindle plate 102 and the hub mount 141 moves to a position above the outboard hub assembly 116. The rotation of the spindle plate 102, raises the hub mount 141 and raises the first end 41 of axle 40. Axle 40 tilts in the direction of the second end 42. Frame 12 and conveyor 10 tilt in the direction of the second wheel 18. As shown in FIG. 3A, the discharge end 14 of the conveyor 10 is moved to the right.

Figure 9:
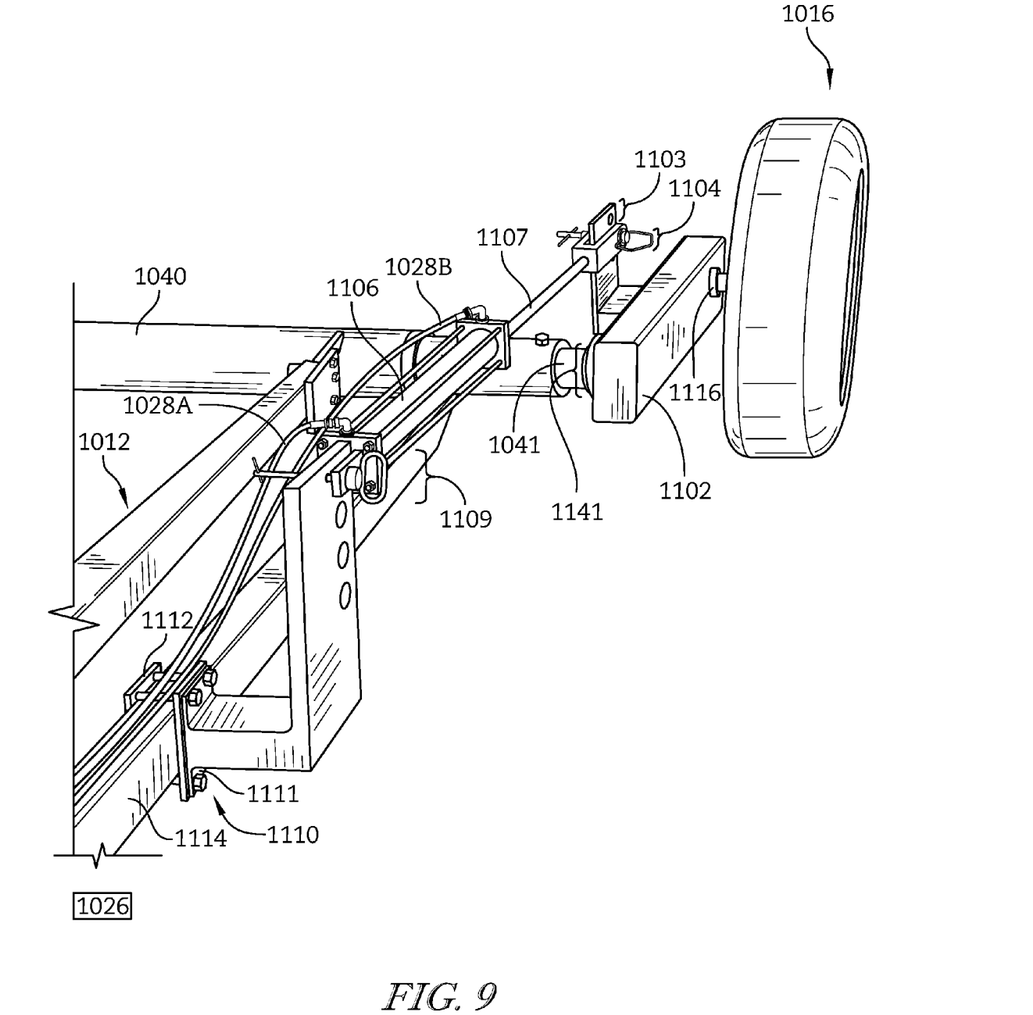
FIG. 9 is a perspective view of an alternate embodiment of the axle tilt mechanism that include a modified frame mount and spindle plate.

In another embodiment, an axle tilt device 1100 is shown for use with a conveyor 10, as shown in FIG. 9. The design of spindle plate 1102 is modified version of spindle plate 102 as shown in FIG. 9 from the spindle plate 102 of FIGS. 2-8. A first bracket 111 mounting plate 1111 and a second mounting plate 1112 are configured to fit a cross member 1114 of a frame 1012 to form clamp 1110.

A first clevis pin mount 1104 rotatably couples bracket arm 1103 of the spindle plate 1102 to extension rod 1107 extending from hydraulic cylinder 1106 as shown in FIG. 9. In this embodiment, spindle plate 1102 is a rectangular tubular member instead of the plate. A second clevis pin mount 1109 rotatably couples hydraulic cylinder 1106 to mounting plate 1111. Mounting plate 1111 includes a horizontal leg 1113 and a vertical leg 1115. Vertical leg 115 is formed to include a series of adjustment apertures 1117 to permit repositioning of hydraulic cylinder 1106. As further shown in FIG. 9, hydraulic cylinder 1106 is controlled by a control device 1026 connected by first and second hydraulic lines 1028A and 10288. Axle 1040 has a first end 1041 coupled to spindle plate 1102 by hub assembly 1141. Hub assembly 1116 couples a first wheel 1016 to the spindle plate 1102. This arrangement properly aligns hydraulic cylinder 1106 with spindle plate 1102.

In another embodiment, axle tilt device 2100 includes modified pivot mounts 2109 and 2104 to properly align hydraulic cylinder 2106 during use as shown in FIGS. 10-13. A first clevis pin 2105 located in an offset position located closer to the middle of the area between first wheel 2016 and second wheel 2018. A second clevis pin 2108 is located in an offset position located further from the middle of the area between first wheel 2016 and second wheel 2018. The location of the clevis pins 2105 and 2108 properly align hydraulic cylinder 2106 so that spindle plate 2102 rotates without binding.

Figure 10:
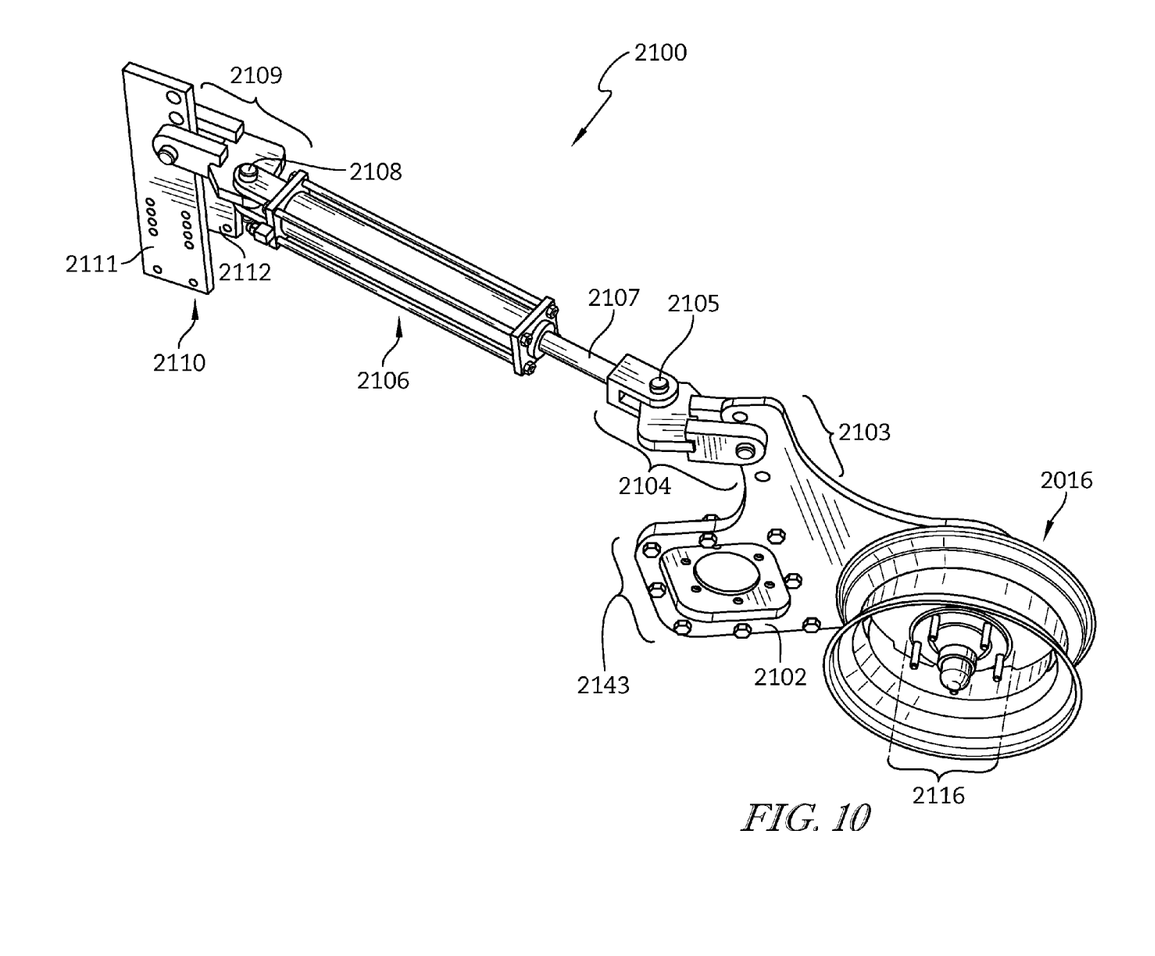
FIG. 10 is a perspective view of hub mount 141 is another embodiment of the axle tilt mechanism showing a spindle plate having a removable hub adapter that can be changed to accommodate various hub bolt configurations.
Figure 11:
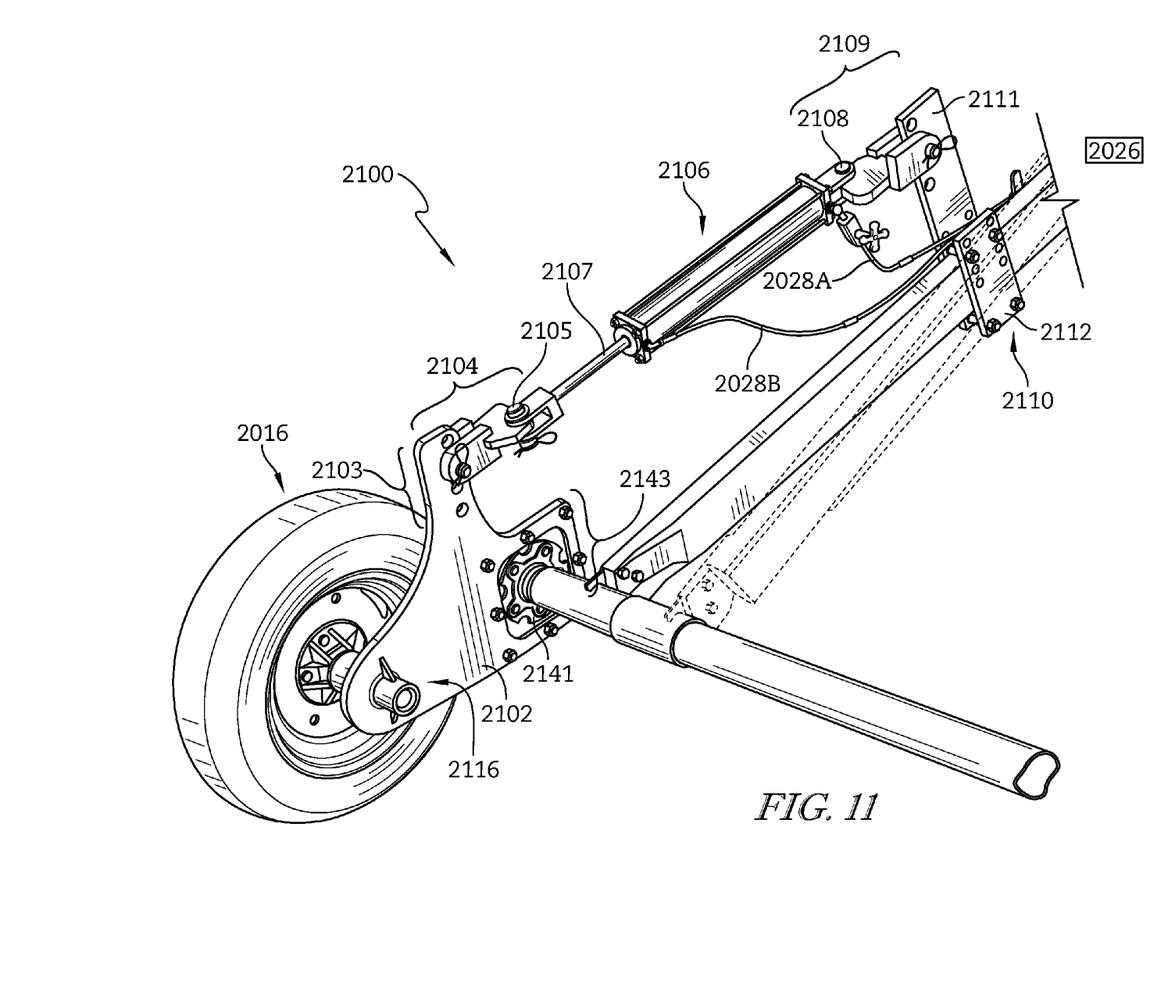
FIG. 11 is a view perspective view of the axle tilt device of FIG. 10 mounted to a frame member and showing the spindle plate coupled to the hub of the axle.
Figure 12:
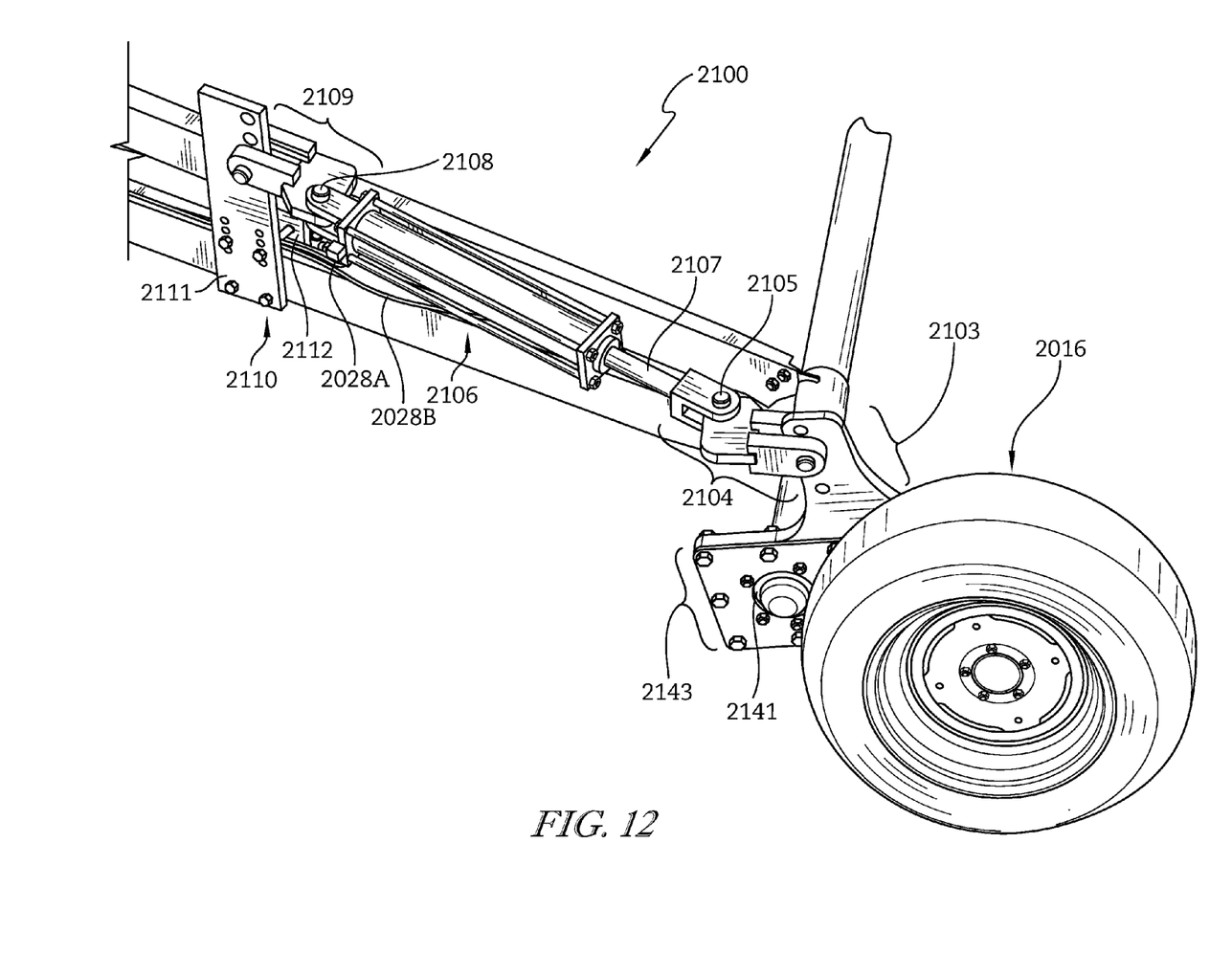
FIG. 12 is a perspective view of the axle tilt mechanism of FIG. 11.
Figure 13:
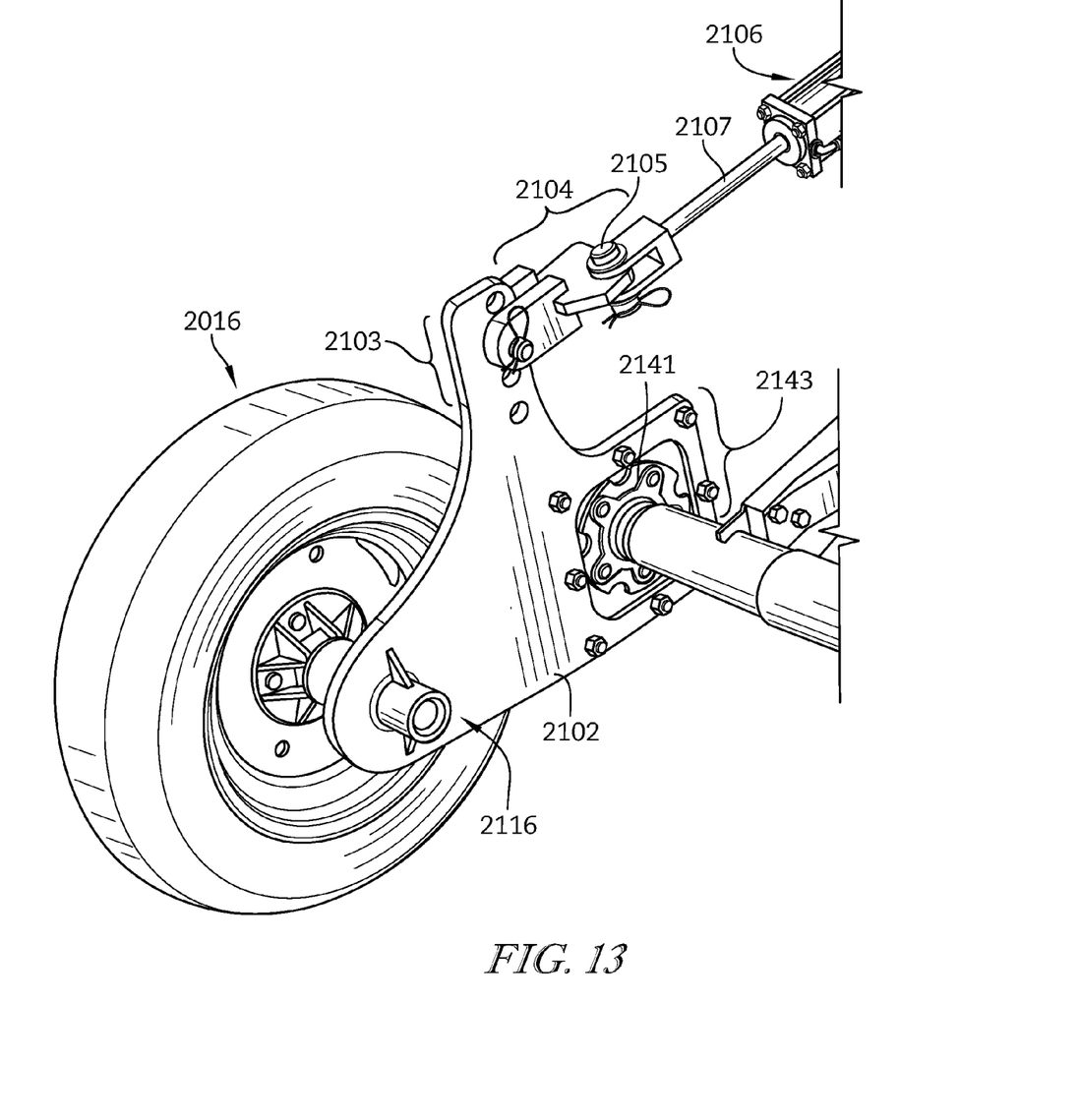
FIG. 13 is an enlarged perspective view axle tilt mechanism of FIG. 10 shown coupled to the hub of the axle.

As suggested in FIG. 11, a first hydraulic line 2028A and a second hydraulic line 2028B cooperate with a control device 2026 to control movement of hydraulic cylinder 2106. As shown in FIG. 10, a hub attachment plate 2143 is customizable. Different bolt patterns can be attached to the hub attachment plate 2143. In one embodiment, axle hub assembly 2141 is configured in a 6 bolt hub pattern with a 6" diameter. In another embodiment, as shown in FIGS. 11-13, an axle hub assembly 2141 is configured as a 5 bolt hub pattern. Other hub patterns with other sizes may also be used. This permits axle tilt device 2100 to be used with conveyors made by various manufacturers.

As shown in FIG. 10, a first pivot mount 2104 couples bracket arm 2103 of spindle plate 2102 to extension rod 2107 of hydraulic cylinder 2106. Rod 2107 is secured to first pivot mount 2104 by use of first clevis pin 2105. A second pivot mount 2109 coupling the hydraulic cylinder 2106 to a first bracket 2111 includes the second clevis pin 2108. A second bracket 2112 cooperates with the first bracket 2111 to form a clamp 2110. An outboard hub assembly 2116 couples a first chock wheel 2016 to the spindle plate 2102.

In another embodiment, an axle tilt device 2100 includes clevis pins 2105 and 2108 in an offset position and a non-adjustable hub mount 2141. In another embodiment, an axle tilt device includes a clevis pin 2105 in an offset position, a clevis pin 2108 not in an offset position and a non-adjustable hub mount 2141. In another embodiment, an axle tilt device 2100 includes a clevis pin 2105 not in an offset position, a clevis pin 2108 in an offset position, and a non-adjustable hub mount 2141.

In another embodiment, axle tilt device 2100 includes a clevis pin 2105 in an offset position, a clevis pin 2108 not in an offset position and an hub attachment plate 2143. In another embodiment, axle tilt device 2100 includes a clevis pin 2105 not in an offset position, a clevis pin 2108 in an offset position, and an hub attachment plate 2143. In another embodiment, axle tilt device 2100 includes an hub attachment plate 2143 and clevis pins 2105 and 2108 that are not offset.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A movable bulk material handling device comprising:
   a conveyor having an intake end and a spaced apart discharge end that is at an elevation greater than the intake end and includes a first position and a second position, the conveyor adapted to convey bulk material from the intake end to the discharge end;
   a frame structure adapted to support the conveyor, the frame structure including a plurality of interconnecting members that form the frame structure;
   an axle coupled to the frame structure, the axle including wheels to allow the movable bulk material handling device to be moved by a land vehicle; and an axle tilt device that is coupled to the frame structure and the axle, the axle tilt device adapted to raise or lower one end of the axle with respect to the frame structure to permit the tilting the frame to cause movement of the discharge end of the conveyor from the first position to the second position, and wherein the axle tilt device includes a spindle mount that is adapted to be mounted to a hub assembly of one end of the axle.

2. The movable bulk material handling device of claim 1, wherein the axle tilt device includes and extension device coupled to the spindle mount at a first end and to a frame bracket at a second end.

3. The movable bulk material handling device of claim 2, wherein the extension device is a hydraulic cylinder.

4. The movable bulk material handling device of claim 2, wherein the extension device is a threaded rod.

5. The movable bulk material handling device of claim 3, wherein movement of the extension device causes the spindle mount to rotate about the hub assembly which, in turn, causes a first end of the axle to raise or lower, moving the discharge end of the conveyor.

6. An axle tilt device for use with a portable bulk material handling conveyor having an axle including a pair of hubs and wheels located on opposite ends of the axle comprising:
    a spindle mount adapted to be mounted to one of the hubs of the axle and rotate about a centerline of the axle by rotation of the hub to which it is attached;
    a hub assembly coupled to the spindle mount, the hub assembly adapted to accept one of the wheels from the axle, wherein rotation of the spindle mount about the centerline of the axle causes an end of the axle closest to the spindle plate to be moved from a first elevation to a second elevation.

7. The axle tilt device of claim 6 further including an extension device that is adapted to rotate the spindle plate about the centerline of the axle.

8. The axle tilt device of claim 7, wherein the spindle mount includes a bracket arm.

9. The axle tilt device of claim 8, wherein one end of the extension device is coupled to the bracket arm of the spindle mount.

10. The axle tilt device of claim 9, further including a frame bracket that is adapted to be coupled to the frame of the portable bulk material handling conveyor to allow a second end of the extension device to be coupled to the frame, wherein actuation of the extension device in a first direction causes the spindle mount to rotate about the centerline of the axle in a first direct, and actuation of the extension device in a second direct causes the spindle mount to rotate about the centerline of the axle in a second direction.

11. The axle tilt device of claim 9, wherein the bracket arm of the spindle mount includes a plurality of mounting positions, each adapted to accept one end of the extension device.

12. The axle tilt device of claim 9, further including a pivot mechanism coupling the extension device to the bracket arm of the spindle mount to form a pivotal connection between the extension device and the bracket arm about to axis of rotation.

13. The axle tilt device of claim 9, further including a hub attachment plate that includes a first set of apertures that allows the hub attachment plate to be coupled to the spindle mount.

14. The axle tilt device of claim 13, further including and a second set of apertures that permit the hub attachment plate to be coupled to the hub of the axle of the portable bulk material handling conveyor.

15. An axle tilt device for use with a portable bulk material handling conveyor having an axle including a pair of hubs located on opposite ends of the axle and wheels coupled to the hubs comprising:
    a spindle mount adapted to be mounted to one of the hubs of the axle and adapted to rotate about a centerline of the axle by rotation of the hub to which it is attached;
    a hub assembly coupled to the spindle mount, the hub assembly adapted to accept one of the wheels from the axle, wherein rotation of the spindle mount about the centerline of the axle causes an end of the axle closest to the spindle plate to be moved from a first elevation to a second elevation with respect to the opposite axle;
    an extension device that is adapted to rotate the spindle plate about the centerline of the axle.

16. The axle tilt device of claim 15, wherein the spindle mount includes a bracket arm.

17. The axle tilt device of claim 16, wherein one end of the extension device is coupled to the bracket arm of the spindle mount.

18. The axle tilt device of claim 16, wherein the bracket arm of the spindle mount includes a plurality of mounting positions, each adapted to accept one end of the extension device.

19. The axle tilt device of claim 18, further including a pivot mechanism coupling the extension device to the bracket arm of the spindle mount to form a pivotal connection between the extension device and the bracket arm about to axis of rotation.

\* \* \* \* \*